(12) United States Patent
Yang et al.

(10) Patent No.: US 11,941,269 B2
(45) Date of Patent: Mar. 26, 2024

(54) DATA STORAGE DEVICE WITH ENHANCED POWER MODE MANAGEMENT

(71) Applicant: Western Digital Technologies, Inc., San Jose, CA (US)

(72) Inventors: Niles Yang, Mountain View, CA (US); Sahil Sharma, San Jose, CA (US); Phil D. Reusswig, Santa Clara, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 78 days.

(21) Appl. No.: 17/701,348

(22) Filed: Mar. 22, 2022

(65) Prior Publication Data

US 2023/0305722 A1 Sep. 28, 2023

(51) Int. Cl.
*G06F 3/06* (2006.01)
*G06F 1/3206* (2019.01)
(52) U.S. Cl.
CPC .......... *G06F 3/0634* (2013.01); *G06F 1/3206* (2013.01); *G06F 3/0625* (2013.01); *G06F 3/0679* (2013.01)
(58) Field of Classification Search
CPC .... G06F 3/0634; G06F 3/0625; G06F 3/0679; G06F 1/3275; G06F 1/189; G06F 1/32; G06F 1/3296; G06F 1/3234; G06F 2212/1024; G06F 1/3206; G06F 1/3228
See application file for complete search history.

(56) References Cited

U.S. PATENT DOCUMENTS

| | | | |
|---|---|---|---|
| 9,304,577 B2 | 4/2016 | Yan | |
| 9,449,655 B1 | 9/2016 | Zonte et al. | |
| 10,990,147 B2 | 4/2021 | Kim et al. | |
| 2014/0132083 A1* | 5/2014 | Marchand | G06F 13/4072 307/130 |
| 2016/0116972 A1* | 4/2016 | Shin | G06F 3/0619 711/162 |
| 2020/0210079 A1 | 7/2020 | Cho et al. | |
| 2021/0018975 A1 | 1/2021 | Liang et al. | |
| 2022/0383930 A1* | 12/2022 | Gajapathy | G06F 1/3209 |

FOREIGN PATENT DOCUMENTS

| | | | | |
|---|---|---|---|---|
| CN | 109672328 A | * | 4/2019 | .......... G11C 16/225 |
| CN | 113986001 A | * | 1/2022 | |

* cited by examiner

*Primary Examiner* — Curtis James Kortman
(74) *Attorney, Agent, or Firm* — Michael Best & Friedrich LLP

(57) ABSTRACT

A data storage device includes a non-volatile memory device having one or more memory dies and each of the memory dies include a plurality of input-output (I/O) lines. The data storage device further includes a controller. The controller is configured to receive an instruction to enter a low-power operating mode. Entering the low-power operating mode includes removing power from the one or more memory dies, providing an output signal toggling between a logic high and a logic low at a predetermined frequency to the plurality of I/O lines for a predetermined period of time, and operating in the low-power operating mode upon the expiration of the predetermined period of time.

19 Claims, 3 Drawing Sheets

DATA STORAGE DEVICE WITH ENHANCED POWER MODE MANAGEMENT

FIELD

This application relates generally to data storage devices, and more particularly, to data storage devices having enhanced power mode functionality to improve energy and operational efficiencies of the data storage devices.

BACKGROUND

Data storage devices, such as solid-state drives ("SSD"), often constantly enter into and exit out of a power saving mode. The power saving mode allows for less power to be consumed by the data storage device when not actively being accessed (e.g., written to or read from). Generally, there is a delay in entering into the power saving mode as residual voltage within the memory dies, such as due to capacitive charges between pads and/or traces, can result in a time delay to fully discharge the power from the memory dies such that the entry into the power saving mode delayed. Additionally, when transitioning from a power saving mode to a normal operation mode, some time is required to charge all capacitive elements within the memory die and/or come up to a full operational voltage level such that the data storage device may be accessed by a host device. This can result in degraded performance due to the delay entering or exiting the power saving mode which prevents the host device from accessing the data storage device.

SUMMARY

Data storage devices, such as solid-state drives, often transition to a low-power operating mode when not being accessed. The transitions into and out of the low-power operating mode occur quickly. For example, the transition to the low-power operating mode and back into a normal operating mode may occur within one second. Thus, delays in the transitions from one mode to the other can results in either energy inefficiency (entering into low-power mode) and/or operational inefficiency (exiting low-power mode). The concepts described herein discuss functions and devices configured to reduce the transition times both into the low-power mode from a normal operating mode, and out of the low-power mode to the normal operating mode. These reductions in transition times increase energy efficiency and operational efficiency, as described in more detail below.

One embodiment of the disclosure describes a data storage device includes a non-volatile memory device having one or more memory dies and each of the memory dies include a plurality of input-output (I/O) lines. The data storage device further includes a controller. The controller is configured to receive an instruction to enter a low-power operating mode. Entering the low-power operating mode includes removing power from the one or more memory dies, providing an output signal toggling between a logic high and a logic low at a predetermined frequency to the plurality of I/O lines for a predetermined period of time, and operating in the low-power operating mode upon the expiration of the predetermined period of time.

In other embodiments, a method is described and is performed by a data storage device having a controller coupled to a non-volatile memory device, according to some embodiments. The method includes receiving an instruction to enter a low-power operating mode and entering the low-power operating mode. Entering the low-power operating mode includes removing power from the one or more memory dies of the non-volatile memory device, providing an output signal toggling between a logic high and a logic low to one or more input-output lines of the non-volatile memory device for a predetermined period of time, and operating in the low-power operating mode upon the expiration of the predetermined period of time.

In other embodiments, a data storage device includes a non-volatile memory device having one or more memory dies and each of the memory dies include a plurality of input-output (I/O) lines. The data storage device further includes a controller. The controller is configured to receive an instruction to enter a low-power operating mode and enter the low-power operating mode. The controller is further configured to activate a write protect input of the memory device to write protect the one or more memory dies upon entering the low-power mode and apply a low-level voltage to one or more power rails of the memory device using the power supply circuit. The controller is additionally configured to maintain the activation of the write protect input and the application of the low-level voltage while in the low-power operating mode.

Various aspects of the present disclosure provide for data storage devices with enhanced power mode functionality. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, MRAM, DRAM, etc.

Figure 1:
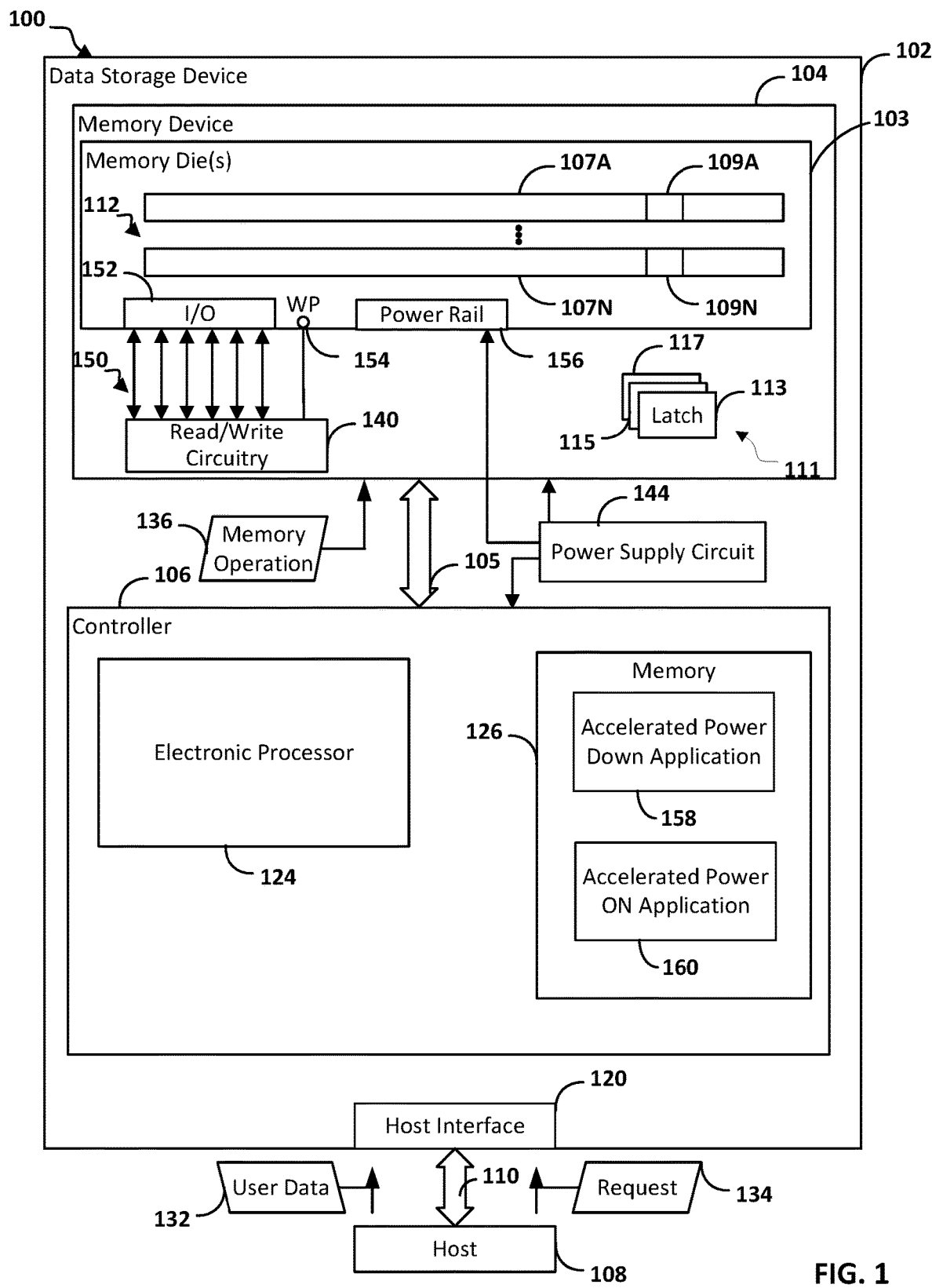
FIG. 1 is a block diagram illustrating one example of a system including a data storage device, according to some embodiments.

FIG. 1 is a block diagram of one example of a system 100 that includes various enhanced power saving mode functionality. In the example of FIG. 1, the system 100 includes a data storage device 102 in communication with a host device 108. The data storage device 102 includes one or more memory devices 104 (e.g., non-volatile memory) that are coupled to a controller 106.

One example of the structural and functional features provided by the controller 106 are illustrated in FIG. 1. However, the controller 106 is not limited to the structural and functional features provided by the controller 106 in FIG. 1. The controller 106 may include fewer or additional structural and functional features that are not illustrated in FIG. 1.

The data storage device 102 and the host device 108 may be operationally coupled through a connection (e.g., a communication path 110), such as a bus or a wireless connection. In some examples, the data storage device 102 may be embedded within the host device 108. Alternatively, in other examples, the data storage device 102 may be removable from the host device 108 (i.e., "removably" coupled to the host device 108). As an example, the data storage device 102 may be removably coupled to the host device 108 in accordance with a removable universal serial bus (USB) configuration. In some implementations, the data storage device 102 may include or correspond to a solid-state drive, which may be used as an embedded storage drive (e.g., a mobile embedded storage drive), an enterprise storage drive, a client storage device, a cloud storage drive, or other suitable storage drives.

The data storage device 102 may be configured to be coupled to the host device 108 using the communication path 110, such as a wired communication path and/or a wireless communication path. For example, the data storage device 102 may include an interface 120 (e.g., a host interface) that enables communication using the communication path 110 between the data storage device 102 and the host device 108, such as when the interface 120 is communicatively coupled to the host device 108. In some examples, the host device 108 may provide power to the data storage device 102. For example, the host device 108 may provide one or more regulated voltages to the data storage device 102, such as 12 VDC, 5 VDC, 3.3 VDC, or other regulated voltage level.

The host device 108 may include a processor and a memory. The memory may be configured to store data and/or instructions that may be executable by the processor. The memory may be a single memory or may include one or more memories, such as one or more non-volatile memories, one or more volatile memories, or a combination thereof. The host device 108 may issue one or more commands to the data storage device 102, such as one or more requests to erase data at, read data from, or write data to the memory device 104 of the data storage device 102. For example, the host device 108 may be configured to provide data, such as user data 132, to be stored at the memory device 104 or to request data to be read from the memory device 104. The host device 108 may include a mobile smartphone, a music player, a video player, a gaming console, an electronic book reader, a personal digital assistant ("PDA"), a computer, such as a laptop computer or notebook computer, any combination thereof, or other suitable electronic device.

The host device 108 communicates using a memory interface that enables reading from the memory device 104 and writing to the memory device 104. In some examples, the host device 108 may operate in compliance with an industry specification, such as a Universal Flash Storage ("UFS") Host Controller Interface specification. In other examples, the host device 108 may operate in compliance with one or more other specifications, such as a Secure Digital ("SD") Host Controller specification or other suitable industry specification. The host device 108 may also communicate with the memory device 104 in accordance with any other suitable communication protocol.

The memory device 104 of the data storage device 102 may include a non-volatile memory (e.g., NAND, NOR BiCS family of memories, or other suitable memory). In some examples, the memory device 104 may be any type of flash memory. For example, the memory device 104 may be two-dimensional (2D) memory or three-dimensional (3D) flash memory. The memory device 104 may include one or more memory dies 103. In some of the embodiments, individual memory dies 103 or groups of memory dies 103 may be referred to as arrays. Each of the one or more memory dies 103 may include one or more memory blocks 112 (e.g., one or more erase blocks). Each memory block 112 may include one or more groups of storage elements, such as a representative group of storage elements 107A-107N. The group of storage elements 107A-107N may be configured as a wordline. The group of storage elements 107A-107N may include multiple storage elements (e.g., memory cells that are referred to herein as a "string"), such as a representative storage elements 109A and 109N, respectively.

The memory device 104 may include support circuitry, such as read/write circuitry 140. Although depicted as a single component, the read/write circuitry 140 may be divided into separate components of the memory device 104, such as read circuitry and write circuitry. The read/write circuitry 140 may be external to the one or more memory dies 103 of the memory device 104. Alternatively, one or more individual memory dies 103 may include corresponding read/write circuitry 140 that is operable to read from and/or write to storage elements within the individual memory die, independent of any other read and/or write operations at any of the other memory dies. For example, the read/write circuitry 140 may be configured to perform various read/write operations such as initial writing to volatile memory, array commit functions, and other functions as required for a given application. The read/write circuitry may communicate (e.g., issue read/write commands) with a memory die 103 via one or more I/O lines 150. The one or more I/O lines 150 may be coupled to an I/O bus 152 internal to the memory die 103. The read/write circuitry 140 may further communicate with a write protection ("WP") pin 154 or input of the memory die 103. The WP pin 154 is configured to prevent writing of data to the memory die 103 when the WP pin 154 is in a predefined state. In one embodiment, the WP pin 154 may prevent data from being written to the memory die 103 based on the WP pin 154 being tied to a logic low (e.g., 0 VDC). However, in other embodiments, the WP pin 154 may prevent data from being written to the memory die 103 based on the WP pin 154 being tied to a logic high. Thus, the WP pin 154 must be activated by the read/write circuitry 140 in order for any writing of data to be performed on the memory die 103. While shown as coupled to the read/write circuitry 140, in some embodiments, the WP pin 154 may be coupled directly to the controller 106, such as via a bus 105. The memory device 104 may further include one or more latches (e.g., a set of latches 111 including latches 113, 115, and 117).

The data storage device 102 may further include a power supply circuit 144. The power supply circuit 144 may be configured to provide power to one or more of the components of the data storage device 102, such as the memory devices 104 and/or the controller 106. In some embodiments, the power supply circuit 144 receives power from the host device 108, such as through the host interface 120, as described above. In other embodiments, the data storage device 102 may have one or more additional interfaces (not shown) for receiving one or more voltages. While the data storage device 102 is shown as having a single power supply circuit 144, more than one power supply circuit 144 may be within a data storage device, as required for a given application. For example, in some examples, the data storage device 102 may include a power supply circuit 144 for each operating voltage associated with or received by the data storage device 102, such as 12 VDC, 5 VDC, 3.3 VDC, or other operating voltage. In some embodiments, the power supply circuit 144 may further couple directly to the memory dies 103 and provide power to a power rail 156 of the memory dies 103.

The controller 106 is coupled to the memory device 104 (e.g., the one or more memory dies 103) using the bus 105, an interface (e.g., interface circuitry), another structure, or a combination thereof. For example, the bus 105 may include multiple distinct channels to enable the controller 106 to communicate with each of the one or more memory dies 103 in parallel with, and independently of, communication with the other memory dies 103. In some embodiments, the controller 106 may communicate with the one or more memory dies 103 via respective read/write circuitry 140.

The controller 106 is configured to receive data and instructions from the host device 108 and to send data to the host device 108. For example, the controller 106 may send data to the host device 108 using the interface 120, and the controller 106 may receive data from the host device 108 using the interface 120. The controller 106 is configured to send data and commands (e.g., the memory operation 136, which may be a cycle operation of a memory block of the memory device 104) to the memory device 104 and to receive data from the memory device 104. For example, the controller 106 is configured to send data and a program or write command to cause the memory device 104 to store data to a specified address of the memory device 104. The write command may specify a physical address of a portion of the memory device 104 (e.g., a physical address of a word line of the memory device 104) that is to store the data, as well as a size (e.g., 2 k, 4 k, etc.) of the data to be written.

The controller 106 is configured to send a read command to the memory device 104 to access data from a specified address of the memory device 104. The read command may specify the physical address of a region of the memory device 104 (e.g., a physical address of a word line of the memory device 104), as well as a size (e.g., 2 k, 4 k, etc.) of the data to be read. The controller 106 may also be configured to send data and commands to the memory device 104 associated with background scanning operations, garbage collection operations, and/or wear-leveling operations, or other suitable memory operations.

The controller 106 may include a processor 124, a memory 126, and other associated circuitry. The memory 126 may be configured to store data and/or instructions that may be executable by the processor 124. The memory 126 may include an accelerated power-down application 158 and an accelerated power-ON application 160, among other applications, programs, etc. In some embodiments, the accelerated power-down application 158 and the accelerated power-ON application 160 may be combined into a singular enhanced power management application. The accelerated power-down application 158 may be configured to perform one or more actions to decrease the amount of time required for the data storage device 102 to enter a low-power mode, as will be described in more detail below. The accelerated power-ON application 160 may be configured to perform one or more actions to decrease the amount of time required for the data storage device 102 to exit a low-power mode (i.e., return to normal operation). While shown as being stored in the memory 126, in some examples the accelerated power-down application 158 and/or the accelerated power-ON application 160 may be configured as a circuit within the memory device 104.

Figure 2:
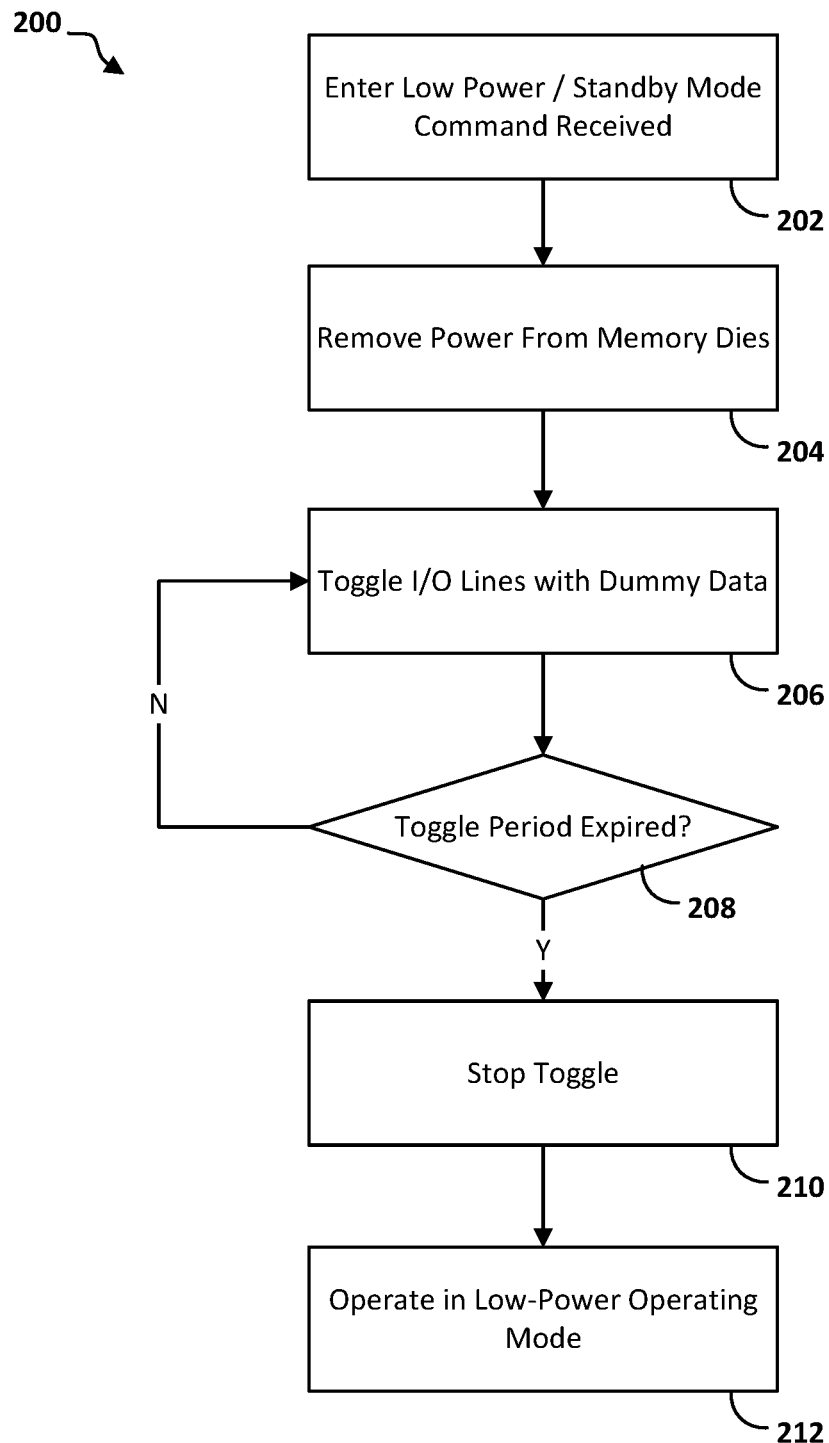
FIG. 2 is a flow chart illustrating a process for an enhanced entry into a low-power mode of a data storage device, according to some embodiments.

Turning now to FIG. 2, a block diagram illustrating a process 200 for performing an accelerated low-power mode is shown, according to some embodiments. In one embodiment, the process 200 may be executed by the processor 124 and the accelerated power-down application 158. At process block 202, the controller 106 may initiate a low-power operation mode. A low-power operation mode may also be referred to as a standby mode. The controller 106 may initiate the low-power operation mode based on a command received from the host device 108. In other embodiments, the controller 106 may initiate the low-power operation mode after no host activity has been received (e.g., read and/or write commands) within a predetermined time period. In some examples, the predetermined time period may be 1 second. However, time periods of more than 1 second or less than 1 second are also considered as required for a given application.

In some embodiments, the low-power operating mode is configured to remove power from the memory device 104, and thereby to the associated memory dies 103. The controller 106 may remain powered to be able to control the data storage device 102 as needed. In one embodiment, during a normal operating mode, the data storage device 102 may consume approximately 5 watts of energy. During a low-power operating mode, the energy consumption of the data storage device may be reduced to approximately 30 milliwatts. However, values of more than 30 milliwatts or less than 30 mW milliwatts are also considered for different applications and/or data storage device types. Put another way, the low-power operating mode may reduce the power consumption of a data storage device, such as data storage device 102, by approximately 97%. However, values of more than 97% or less than 97% are also contemplated as appropriate for a given application or device.

At process block 204, the controller 106 removes power from the memory device, or memory devices, 104, and thereby the memory dies 103 associated with the memory device 104. In one embodiment, the controller 106 instructs the power supply circuit 144 to remove power from the memory device 104 and associated memory dies 103. The memory dies 103 include multiple connection pads, traces, and other conductive elements which may act as parasitic capacitors within the memory dies 103. This parasitic capacitance may store a voltage even after power has been removed from the memory device 104. The voltage stored by the various parasitic capacitances within the memory device 104 may take a period of time to dissipate upon power being removed, resulting in additional time in which the data storage device 102 is not fully in the low-power mode. In some examples, the time required to dissipate the parasitic capacitances may be 5 milliseconds. However, times of more than 5 milliseconds or less than 5 milliseconds are also contemplated as required for a given application. In some applications, a data storage device, such as data storage device 102, may enter into a low-power operation mode and be instructed to exit the low-power operation mode within one second. However, time periods of more than one second or less than one second are also contemplated. Thus, it is advantageous to operate in the low-power operation mode as quickly as possible to maximize the energy savings.

At process block 206, the controller 106 toggles the I/O lines of a memory die 103, such as I/O lines 150, with dummy data (e.g., a constant transition between logic HIGH and logic LOW). This toggling of the I/O lines causes the residual voltage due to the parasitic capacitances to dissipate more quickly than what occurs simply by removing power to the memory dies 103. In some embodiments, the I/O lines are toggled at a predetermined frequency. In some examples, the predetermined frequency is greater than 100 kilohertz. In other examples, the predetermined frequency may be approximately 20 megahertz. However, speeds of more than 20 megahertz or less than 20 megahertz are also considered as appropriate for a given application. The speed of the toggling is generally substantially faster than the natural time to fully enter a low-power mode, such as the 5 milliseconds (i.e., 200 Hz) low-power mode transition time discussed above, to maximize the reduction in time required to enter the low-power mode.

At process block 208, the controller 106 determines whether a toggle period has expired. The toggle period may be a predefined time such as 100 microseconds. However, times of more than 100 microseconds or less than 100 microseconds are also contemplated. The toggle period may be based on various factors, such as the number of memory dies 103, the density of components within the memory dies 103, an operating voltage of the memory dies 103, etc. In some embodiments, the controller 106 determines that the toggle period has expired based on detecting one or more voltages within the memory dies 103, such as on the I/O lines 150, falling below a predetermined value, such as 1 millivolt. However, values of more than 1 millivolt or less than 1 millivolt are also considered as appropriate for a given application. In response to the controller 106 determining that the toggle period has not expired, the controller 106 continues to toggle the I/O lines 150 of the memory dies 103 at process block 206.

In response to determining that the toggle period has expired, the controller 106 stops togging the I/O lines 150 at process block 210, and the data storage device 102 enters the low-power operation mode at process block 212. As noted above, the process 200 can reduce the amount of time required for the data storage device 102 to enter low-power operation, thereby increasing the energy efficiency of the data storage device. In some examples, the process 200 may improve energy efficiency of a data storage device by 1-2%.

Figure 3:
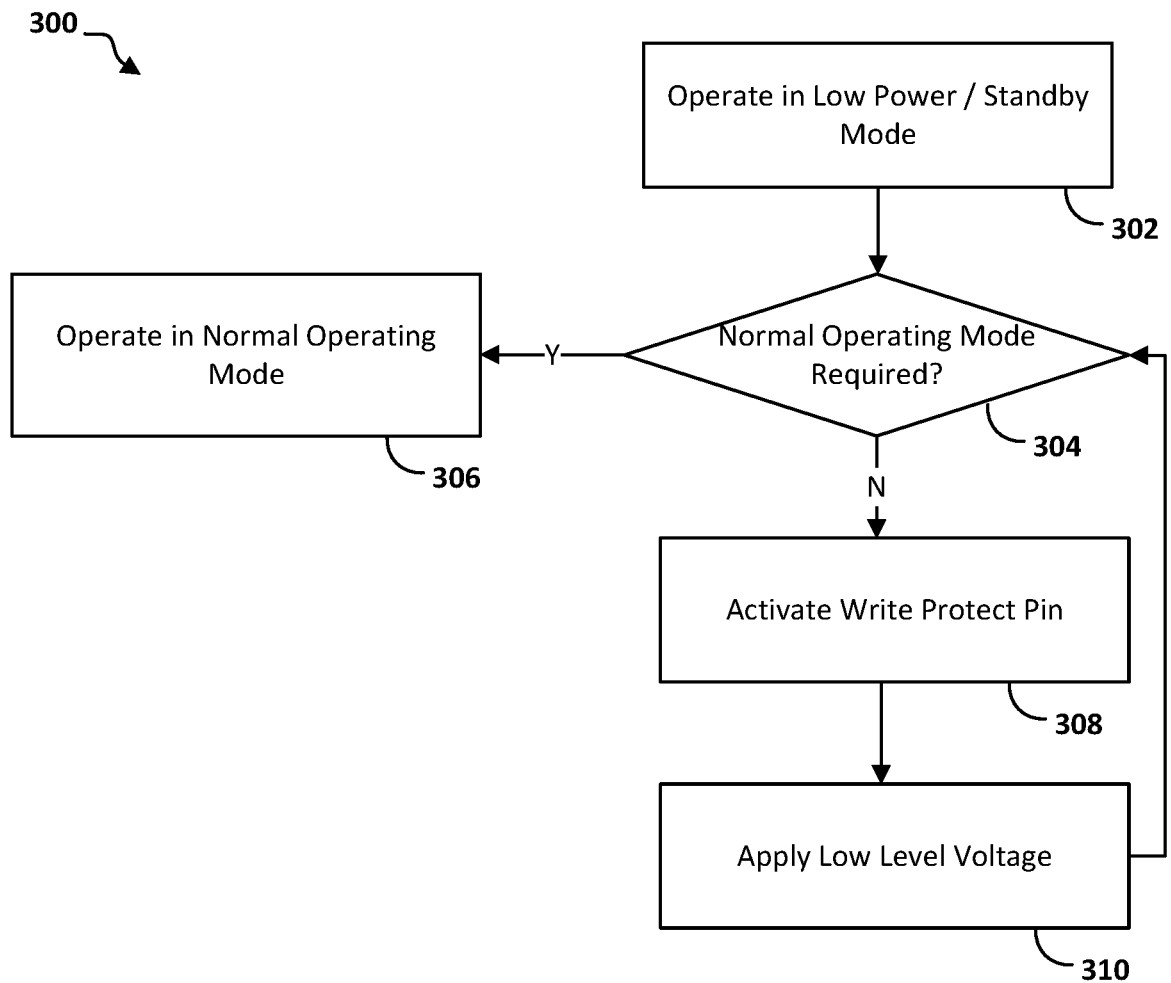
FIG. 3 is a flow chart illustrating a process for an enhanced transition from a low-power mode to a normal operating mode of a data storage device, according to some embodiments.

Turning now to FIG. 3, a process 300 for reducing a time period required to transition from a low-power operating mode to a normal operating mode is shown, according to some embodiments. As noted above, the memory device 104 and associated memory dies 103 have multiple conductive surfaces that may act as capacitors. When transitioning from a low-power operating mode, as described above, to a normal operating mode, the time required to charge the parasitic capacitors can increase the time required for the data storage device to enter the normal operating mode. For example, the time required to charge the various parasitic capacitors within the memory device 104 may take approximately 100 microseconds. However, times of more than 100 microseconds or less than 100 microseconds are also possible, and the delay time is dependent on factors such as a number of memory dies 103 connected to a power rail 156, a density of the memory dies, etc. The process 300 is configured to reduce the delay in a data storage device 102 entering the normal operating mode, thereby increasing operational efficiency by reducing any delays in reading data from, or writing data to, the data storage device 102 by a host device, such as host device 108 when transitioning from the low-power mode to a normal operating mode. In some embodiments, the process 300 may be executed by the electronic processor 124 and the accelerated power ON application 160.

At process block 302, the controller 106 operates the data storage device 102 in a low-power operation mode, such as described above. At process block 304 the controller 106 determines whether a normal operation mode is required. The controller 106 may determine that normal operation mode is required based on a command provided by a host device, such as host device 108. In some embodiments, the controller 106 may determine that the normal operation mode is required based on a request for accessing or writing data being received from a host device, such as host device 108. In other examples, the controller 106 may determine whether the normal operation mode is required based on other criteria, such as external commands, required controller 106 operations, etc. In one embodiment, the normal operation mode is standard operating state of the data storage device 102 when not in the low-power operating mode.

In response to determining that the normal operation mode is required, the controller 106 operates the data storage device 102 in the normal operation mode (e.g., full power mode) at process block 306, such that data may be read from, or written to, the memory device 104. In response to determining that the normal operating mode is not required, a signal is provided to the WP pin 154 to activate the write protect mode of the memory device 104 at process block 308. As noted above, the WP pin 154 may be activated using a logic high or a logic low signal, depending on the application. The WP pin 154 is activated to prevent any data from being written to the memory dies 103 within the memory device 104. In one embodiment, the WP pin 154 is maintained in an activated state until data storage device 102 devices transitions to the normal operating mode.

At process block 310, a low-level voltage is applied to the power rails 156 of the memory device 104, and thereby the memory dies 103. In one embodiment, the applied low-level voltage is at a level lower than a normal operating mode voltage. For example, the applied low-level voltage may be 15% of the normal operating mode voltage. In another example, the applied low-level voltage may be 20% of the normal operating mode voltage. However, other voltage levels of between 15% and 20%, more than 20%, or less than 15% are also contemplated. By applying a low-level voltage to the power rails of the memory device 104, the various parasitic capacitances within the memory device 104 and associated memory dies 103 can be pre-charged to reduce the time required to perform a full power up upon switching to the normal operating mode. This can reduce the time required to power up the memory device 104 power rails 156 as the power rails 156 are already partially charged. In one embodiment, the power-up time required to transition from a low-power mode to a normal operating mode is reduced by approximately 20%. However, values of more than 20% or less than 20% are also contemplated.

The controller 106 then again determines whether the normal operating mode is required at process block 304 and the process 200 continues as described above.

While the above systems, devices, processes, etc., have been described with respect to a data storage device, it is contemplated that other electronic devices, such as cellular phones, tablet computers, laptops, etc., may utilize one or more of the concepts described herein for monitoring one or more power supplies for an over-voltage condition.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device, comprising:
    a non-volatile memory device including one or more memory dies, wherein each of the one or more memory dies include a plurality of input-output (I/O) lines; and
    a controller configured to:
        enter a low-power operating mode by:
            removing power from the one or more memory dies,
            providing an output signal toggling between a logic high and a logic low at a predetermined frequency to the plurality of I/O lines for a predetermined period of time, and
            operating in the low-power operating mode upon an expiration of the predetermined period of time.

2. The data storage device of claim 1, further comprising a power supply circuit configured to provide power to the one or more memory dies.

3. The data storage device of claim 2, wherein the controller is further configured to:
    activate a write protect input of the non-volatile memory device to write protect the one or more memory dies upon entering the low-power operating mode;
    apply a lower-level voltage to one or more power rails of the non-volatile memory device using the power supply circuit while in the low-power mode; and
    maintain the activation of the write protect input and the application of the lower-level voltage while in the low-power operating mode,
    wherein the lower-level voltage is less than a normal operating mode voltage.

4. The data storage device of claim 3, wherein the lower-level voltage is 20% of the normal operating mode voltage.

5. The data storage device of claim 3, wherein the application of the lower-level voltage to the one or more power rails reduces a time required to enter a normal operation mode by 20% versus not applying the lower-level voltage to the one or more power rails.

6. The data storage device of claim 1, wherein the predetermined frequency is greater than 100 kHz.

7. The data storage device of claim 1, wherein toggling the I/O lines reduces a time required to enter the low-power operating mode by 20% versus when not toggling the I/O lines.

8. A method performed by a data storage device having a controller coupled to a non-volatile memory device, the method comprising:
    receiving an instruction to enter a low-power operating mode; and
    entering the low-power operating mode by:
        removing power from one or more memory dies of the non-volatile memory device,
        providing an output signal toggling between a logic high and a logic low to one or more input-output lines of the non-volatile memory device for a predetermined period of time, and
        operating in the low-power operating mode upon an expiration of the predetermined period of time.

9. The method of claim 8, wherein the toggling is performed at a predetermined frequency.

10. The method of claim 9, wherein the predetermined frequency is greater than 100 kHz.

11. The method of claim 8, further comprising:
    activating a write protect input of the non-volatile memory device;
    applying a lower-level voltage to one or more power rails of the non-volatile memory device; and
    maintaining the activation of the write protect input and the application of the lower-level voltage while in the low-power operating mode,
    wherein the lower-level voltage is less than a normal operating mode voltage.

12. The method of claim 11, wherein the lower-level voltage is 20% of the normal operating mode voltage.

13. The method of claim 11, wherein application of the lower-level voltage to the one or more power rails reduces a time to enter a normal operation mode by 20% voltage versus not applying the lower-level voltage to the one or more power rails.

14. The method of claim 8, wherein toggling the input-output lines reduces a time required to enter the low-power operating mode by 20% versus when not toggling the I/O lines.

15. A data storage device, comprising:
 a non-volatile memory device including one or more memory dies, wherein each of the one or more memory dies include a plurality of input-output (I/O) lines;
 a power supply circuit configured to provide power to the data storage device; and
 a controller configured to:
  receive an instruction to enter a low-power operating mode,
  enter the low-power operating mode by:
   removing power from the one or more memory dies
   providing an output signal toggling between a first voltage level and a second voltage level at a predetermined frequency to the plurality of I/O lines, and
   removing the output signal upon a voltage of the plurality of I/O lines falling below a predetermined threshold;
  activate a write protect input of the non-volatile memory device to write protect the one or more memory dies upon entering the low-power operating mode,
  apply a lower-level voltage to one or more power rails of the non-volatile memory device using the power supply circuit, and
  maintain the activation of the write protect input and the application of the lower-level voltage while in the low-power operating mode,
  wherein the lower-level voltage is less than a normal operating mode voltage.

16. The data storage device of claim 15, wherein the predetermined frequency is at least 100 kHz.

17. The data storage device of claim 15, wherein the lower-level voltage is 20% of the normal operating mode voltage.

18. The data storage device of claim 15, wherein the application of the lower-level voltage to the one or more power rails reduces a time required to enter a normal operation mode by 20% versus not applying the low-level voltage to the one or more power rails.

19. The data storage device of claim 15, wherein toggling the I/O lines reduces a time required to enter the low-power operating mode by 20% versus when not toggling the I/O lines.

\* \* \* \* \*